May 8, 1928.  
S. B. HASELTINE  
1,668,899  
FRICTION SHOCK ABSORBING MECHANISM  
Original Filed May 14, 1924   2 Sheets-Sheet 2
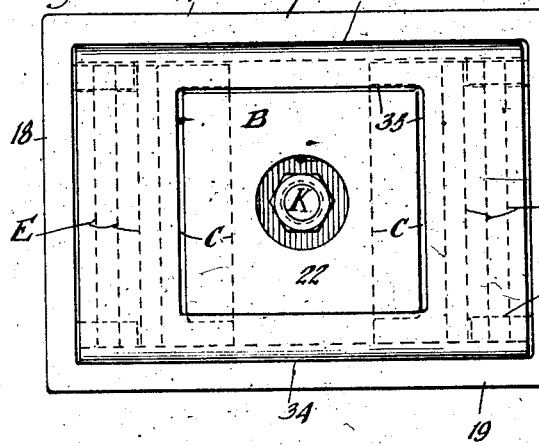
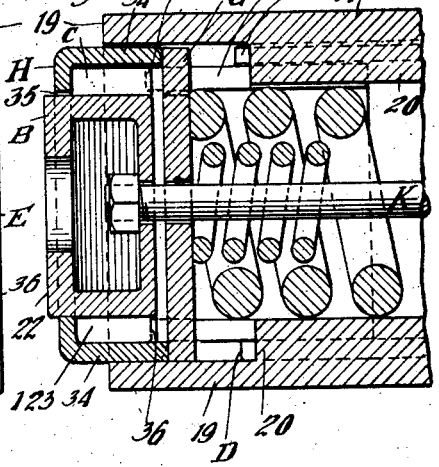
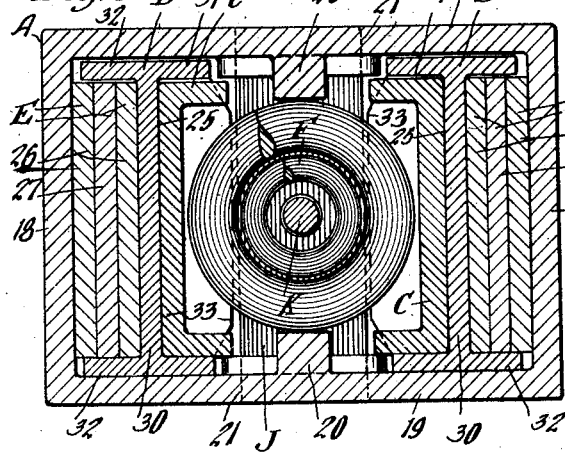
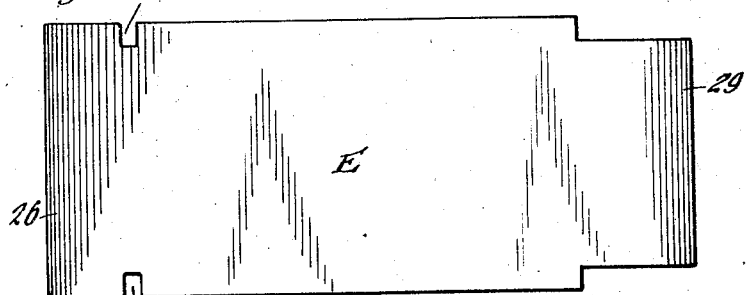
Inventor  
Stacy B. Haseltine Patented May 8, 1928.

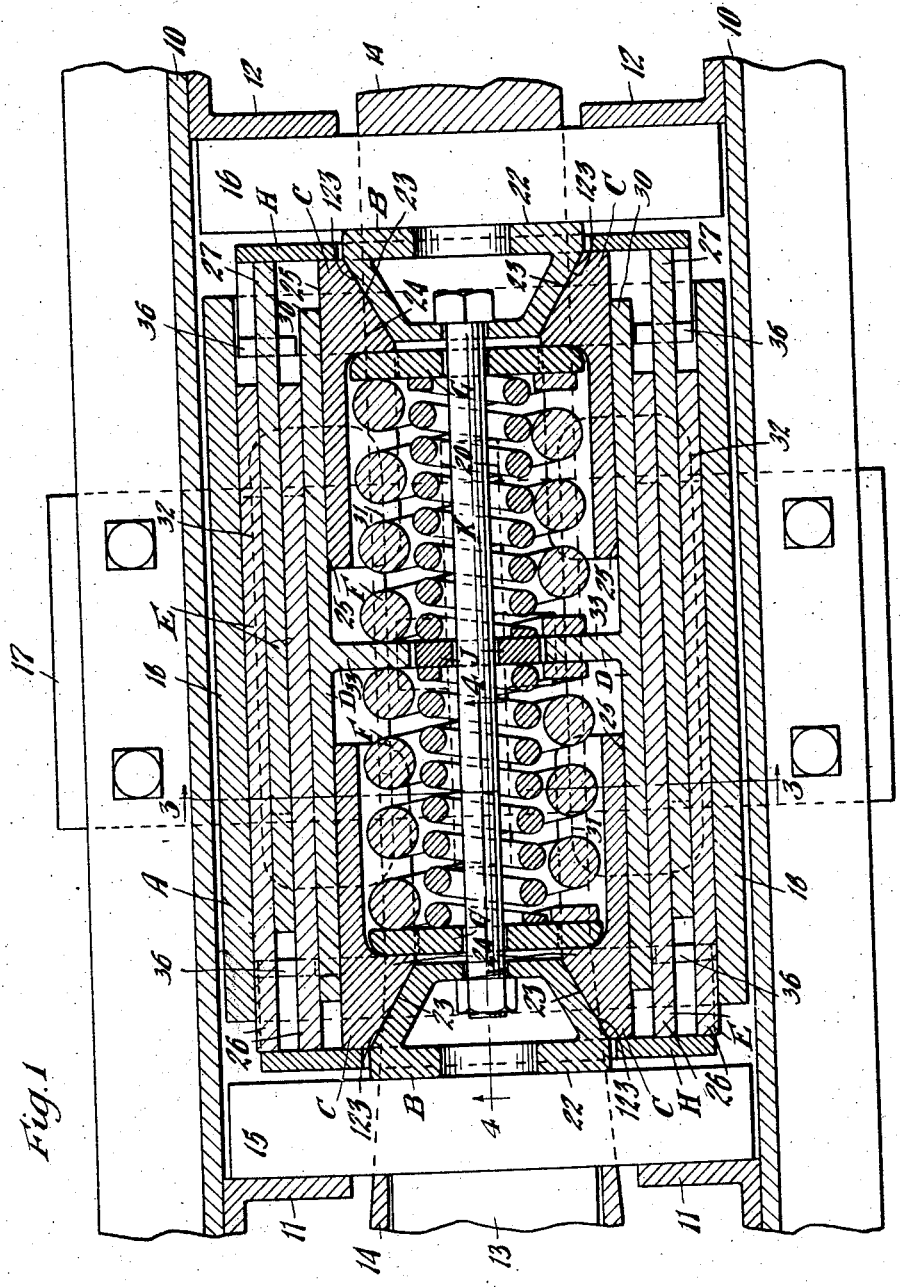

1,668,899

UNITED STATES PATENT OFFICE.

STACY B. HASELTINE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed May 14, 1924, Serial No. 713,138. Renewed February 6, 1928.

This invention relates to improvements in friction shock absorbing mechanisms.

One object of the invention is to provide a high capacity friction shock absorbing mechanism, of the intercalated plate type, especially adapted for railway draft riggings, having a relatively light frictional resistance during the initial action and at which time there is no relative movement of the friction plates with reference to each other.

A main object in this invention is to provide a mechanism of this type, wherein release of the wedge system is assured and wherein the plates are forced into close frictional engagement for their full length and buckling is prevented. The latter refers to the flanges on members D.

Another object of the invention is to provide a friction shock absorbing mechanism, including a friction shell, a plurality of intercalated friction elements and a coacting friction wedge system, together with means for restoring the friction elements to normal position after each compression stroke, so arranged that restoration of the friction elements is assured by effecting release of the friction wedge system prior to any relative release movement of the friction elements themselves.

A more specific object of the invention is to provide a mechanism of the character indicated, including a friction shell, a plurality of relatively movable coacting friction elements and tandem arranged springs directly coacting with said shell and certain of said friction elements to restore the same to normal centered position.

Other objects and advantages of the invention will more clearly appear from the description and claims hereinafter following.

In the drawings forming a part of this specification, Figure 1 is a longitudinal, horizontal, sectional view of a portion of a railway draft rigging showing my improvements in connection therewith. Figure 2 is a front end, elevational view of the shock absorbing mechanism proper. Figure 3 is a vertical transverse, sectional view corresponding substantially to the line 3—3 of Figure 1. Figure 4 is a longitudinal, sectional view of the forward portion of the shock absorbing mechanism proper, corresponding substantially to the line 4—4 of Figure 1. And Figure 5 is a detailed, side elevational view of one of the friction plates of said mechanism.

In said drawings, 10—10 indicate the usual channel shaped center or draft sills of a railway car under-frame to the inner faces of which are secured front stop lugs 11—11 and rear stop lugs 12—12. The inner end portion of the drawbar is indicated at 13, the same being operatively connected to a yoke 14 of well known form, within which are disposed the shock absorbing mechanism proper, a front follower 15 and a rear follower 16. The yoke and parts therewithin are supported in operative position by a detachable saddle plate 17.

The improved shock absorbing mechanism proper, as shown, comprises broadly, a friction shell or casing A; front and rear wedge blocks B—B; front and rear pairs of wedge shoes C—C; two friction elements D—D; two groups of intercalated friction plates E—E; tandem arranged spring resistance elements F—F; front and rear spring followers G—G; front and rear clips H—H; a partition plate J; and a retainer bolt K.

The friction shell or casing A is in the form of a rectangular box-like casting, open at its opposite ends, and has spaced, longitudinally disposed side walls 18—18 and longitudinally disposed, spaced top and bottom walls 19—19, the interior faces of the side walls 18 presenting longitudinally extending friction surfaces adapted to coact with the outermost plates of the groups of plates E—E. As clearly shown in Figure 1, the shell A is of such a length that the front and rear ends thereof are normally spaced from the front and rear followers respectively. Each of the walls 19 of the shell has on the interior side, a longitudinally disposed, relatively wide, central rib 20 having its front and rear ends spaced inwardly from the corresponding ends of the shell, as clearly shown in Figures 1 and 4. The spaced top and bottom ribs 20 act to maintain the spring resistance elements F in position, the bottom rib further serving as a support for the springs. Midway between the ends of the shell, the top and bottom walls are provided with vertically alined, short, transverse openings 21 adapted to receive top and bottom ends respectively of the vertically disposed plate J, the plate being held closely within the openings 21 and secured by means of the retainer-bolt K. Each of the openings 21 is preferably reinforced by a boss located on the inner side of the corresponding wall 19.

The front and rear wedge blocks B are of like construction, each being in the form of a hollow casting and having an outer flat face 22 adapted to abut the inner surface of the corresponding main follower. Each block is also provided with a pair of faces 23 at the opposite sides thereof, converging inwardly of the mechanism and adapted to coact with the adjacent pairs of friction wedge shoes C.

The friction wedge shoes C—C, which are four in number, are arranged in pairs at the opposite ends of the mechanism, each pair co-operating with the corresponding wedge block B. On the inner side, that is, the side nearest the longitudinal axis of the mechanism, each shoe has an enlargement 24 provided with an outer wedge face 123 correspondingly inclined to and adapted to coact with the corresponding wedge faces of one of the blocks B. The outer side of each shoe is flat, presenting an elongated friction surface 25 adapted to coact with the corresponding friction element D.

As herein shown, two groups of friction plates E are employed, one group being disposed on each side of the mechanism. Each group is preferably composed of outer and inner plates 26—26 and an intermediate plate 27. The outer plate 26 of each group has frictional contact with the inner surface of the corresponding side wall 18 of the shell and the inner plate 26 of each group frictionally engages the outer face of the adjacent friction element D. The plates 26 and 27 are of similar construction, and as best shown in Figure 5, each plate has at one end, vertically alined top and bottom notches 28. At the opposite end, the top and bottom edges of the plate are cut away to provide a section of reduced height 29. The plates 26 and 27 of each group are reversely arranged, the plates 26 having the notches 28 at the forward end and the plates 27 having the notches at the rear end. The two friction elements D are of like construction, each being in the form of an elongated member of I-cross section for the greater portion of its length, having a vertically disposed section 30 and horizontally disposed top and bottom plate-like sections defining inner and outer stiffening flanges 31 and 32. The inner and outer surfaces of the section 30 are flat, as shown, presenting longitudinally disposed friction surfaces. Each element D has a transversely disposed, vertical web 33 formed integral therewith and located midway between its ends. The elements D are disposed on opposite sides of the longitudinal center of the mechanism, each being interposed between one of the groups of plates E and the corresponding front and rear shoes, the flat outer face 25 of the shoes bearing on the inner surface of the section 30 and the innermost plate 26 of said group bearing on the outer surface of said section. The top and bottom flanges 31 and 32 in addition to serving as stiffening members for the elements D act as top and bottom guides for the shoes C and the two groups of plates respectively. When the parts are assembled, the webs 33 are substantially in transverse alinement and clear the central partition J. The webs 33 and the partition plate J jointly serve as abutment means for the inner ends of the outer coils of the respective spring resistance elements F, and the plate J also serves as an abutment for the inner ends of the inner coils of said spring elements, the spring resistance elements F being arranged in tandem as shown, one having its front end engaging the front spring follower G and the other having its rear end engaging the rear spring follower plate G. The front and rear spring followers G bear directly on the inner sides of the enlargements 24 of the front and rear pairs of shoes respectively. The follower plates G are preferably of rectangular shape with the corners notched and project above and below the corresponding pair of shoes and the adjacent groups of plates as clearly shown in Figure 4.

The two clips H—H, one of which is disposed at each end of the mechanism, are of like construction. Each clip H is in the form of a rectangular plate having inwardly projecting top and bottom flanges 34. The plate-like portion of each clip is provided with a rectangular opening 35 through which the outer end of the corresponding wedge block B projects. The openings 35 are of such a size as to allow free working movement of the wedges therein. The top and bottom flanges 34 of the clips embrace the outer ends of the plates E and the inner edges of said flanges normally abut the corresponding spring follower G. On the inner side, adjacent the free edge thereof, each flange 34 is provided with a pair of short, transverse ribs 36 disposed at opposite ends thereof, each rib being accommodated in the space between the corresponding friction element D and the adjacent side wall 18 of the shell. The ribs 36 of the top and bottom flanges of each clip are vertically alined, the top and bottom ribs of the front clip being engaged respectively within the top and bottom notches 28 of the plates 26, and the top and bottom ribs of the rear clip engaging within corresponding notches of the plates 27. The notches 28 of each of the plates 26 and 27 are so spaced with reference to the end of the plate that said end will abut the inner surface of the plate-like body portion of the corresponding clip.

The reduced sections 29 of the plates are adapted to work between the top and bottom ribs 36 of the respective clips and said sections are made of the proper length to provide sufficient clearance to permit full movement of the plates during a compression stroke. The clips are preferably hardened, so that they also function as wear plates coacting with the ends of the friction plates 26 and 27.

It will be evident that the outer coils of the twin springs, which bear on the webs 33 of the element D, and the partition J, and the inner coils of said springs, which bear on the latter, serve to maintain the elements D and the shell A properly centered and in the same relative position with respect to one another. When the parts are in normal full release position, the clips H are held in their outermost position by the springs F coacting with the respective spring followers G, that is, the plates will be maintained in the position shown in Figure 1, the plates 26 having their front ends projecting beyond the corresponding end of the shell and the plates 27 having their rear ends projecting beyond the rear end of the shell, and the outer faces of the corresponding clips being slightly spaced from the front and rear followers.

The parts of the shock absorbing mechanism are held in assembled relation and the mechanism maintained at the proper overall length by the retainer bolt K extending through the inner coils of the tandem springs F and alined openings in the central partition J and front and rear spring followers G—G and having its front and rear ends anchored in the recesses of the hollow front and rear wedges respectively. The bolt K also serves to hold the mechanism under initial compression. As wear occurs on the various friction and wedge faces, compensation therefor will be had by the expansion of the twin spring elements F, which are free to force the wedge shoes apart.

The operation of the mechanism is as follows, assuming an inward or buffing movement of the drawbar. The front follower 15 will be moved rearwardly, compressing the tandem spring resistance elements F and thereby forcing the rear set of wedge shoes C into full wedging engagement with the rear wedge B, which is held stationary by the follower 16. At the same time, a wedging action will be set up simultaneously at both ends of the device, between the front and rear wedges and shoes, placing the friction plates under lateral pressure, which is distributed uniformly over their entire surfaces by reason of the stiffening flanges 31 and 32 of the members D. As rearward movement of the follower 15 continues, the front set of shoes will slide on the friction elements D. At the same time although there is a relative slipping between the front shoes and elements D, due to the friction between the parts, the elements D will be carried with the shoes, but at a slower rate. The friction elements D, the shell A and friction plates E—E will be carried rearwardly in unison, due to friction between the parts, the shell and elements D in addition being forced rearwardly directly by the pressure of the front spring F. A relative sliding movement of the elements D and the front and rear set of shoes C will thus be effected. During this action, the front spring follower G will be moved inwardly away from the inner end of the front clip H, the front follower 15 will approach said clip and the forward ends of the plates 26, and the plates 27 together with the rear clip H will approach the rear follower 16. This action will continue until the front and rear followers engage the front and rear clips H respectively, whereupon the plates 26 and 27 will be moved relatively to each other, greatly augmenting the frictional resistance offered. The described movement of the followers, plates and shell continues until the actuating force is removed or until the front and rear ends of the shell A abut the front and rear followers, whereupon the force is transmitted directly through the shell members D and followers to the rear stop lugs, thereby preventing the springs from being driven solid.

During draft, the action is substantially the reverse of that just described, the front follower 15 remaining stationary while the rear follower is moved toward the same.

Upon reduction of the actuating force, the wedging pressure will be relieved and there will be an initial release movement of the friction shoes and wedges due to the spring followers G being spaced inwardly of the corresponding clips H during compression of the mechanism. An easy and quick release and certain reduction of lateral pressure on the group of friction plates is thus assured. As either set of shoes at the front or rear end of the mechanism move outwardly relatively to the shell, due to the expansive action of the springs F, the spring follower G which moves outwardly in unison therewith comes into engagement with the corresponding clip and the plates which are anchored to the clip will be carried outwardly therewith. On account of the friction existing between the plates of each group, the remaining plates will be moved forward also until they are arrested by the clip to which they are anchored coming into engagement with the corresponding spring follower G. At the same time, the tandem springs acting on the webs 33 and the partition J will restore the friction elements D and the shell A to centered position.

I have herein shown and described what I now consider the preferred manner of carrying out my invention, but the same is merely illustrative, and I contemplate all changes and modifications that come within the scope of the claims appended hereto.

I claim:

1. In a friction shock absorbing mechanism, the combination with a group of intercalated, relatively movable friction plates; of a friction element coacting with said plates; lateral pressure-creating means disposed at each end of the mechanism at one side of said group of plates; a lateral pressure-resisting member disposed at the opposite side of said group of plates; and a main spring resistance cooperating with each lateral pressure creating means and directly engaging both said member and element to restore the same to normal, central position.

2. In a friction shock absorbing mechanism, the combination with a group of longitudinally disposed, relatively movable coacting friction elements, one of said elements being longitudinally braced and having abutment means midway between the ends thereof; of lateral wedge pressure creating means disposed at opposite ends of said group of elements and coacting with one side thereof; lateral pressure-resisting means coacting with the opposite side of said group of elements, said last named means also having abutment means thereon; and tandem arranged springs bearing on both of said abutment means, said tandem arranged springs coacting respectively with said wedge pressure-creating means.

3. In a friction shock absorbing mechanism, the combination with a group of longitudinally disposed, relatively movable coacting friction plates; of relatively movable follower acting means adapted to effect relative movement of said plates; a friction element at one side of said group of plates, said element being provided with longitudinally disposed stiffening members and a transverse web; a lateral pressure-resisting member engaging the opposite side of said group of plates, said member having a transverse wall; a friction wedge system at each end of the mechanism for placing said plates under lateral pressure, including a wedge member and a friction shoe engaging said friction element; and front and rear spring resistance for said wedge systems, said spring resistance elements co-operating respectively with said element bearing on opposite sides of said web and wall.

4. In a friction shock absorbing mechanism, the combination with front and rear main followers; of a group of intercalated, relatively movable friction elements interposed between said followers, the elements of said group having the opposite ends normally spaced from said followers; means for restoring said elements to normal position, said means including wear plate members co-operating with the front and rear ends of said elements, said plates being anchored to said elements and engaging the outer ends thereof; lateral pressure-creating means on one side of said group of elements; a lateral pressure-resisting member disposed on the opposite side of said elements; and a spring resistance coacting with said means for restoring said elements and said pressure-creating means.

5. In a friction shock absorbing mechanism, the combination with a group of longitudinally disposed, relatively movable coacting friction elements; of a friction wedge system including a friction shoe engaging one side of said group of elements; and lateral pressure resisting means engaging the other side of said group of elements and limiting lateral outward movement thereof in one direction and also limiting lateral outward movement of said friction wedge system in the opposite direction; a clip engaging the outer ends of alternate elements of said group, said clip having means thereon for restoring said elements to normal position; movable follower means adapted to engage said clip and move the same to effect relative movement of said elements; a spring follower coacting with said clip and shoe; and a main spring resistance.

6. In a friction shock absorbing mechanism, the combination with a friction shell; of groups of relatively movable, intercalated, friction plates coacting with the shell; means for effecting relative movement of said plates, said means being normally spaced from said plates; spreading means between said groups of plates for placing the same under lateral pressure, said spreading means including friction shoes; a longitudinally disposed friction element interposed between said shoes and each group of plates, each of said elements being provided with stiffening means; and a spring resistance coacting with said shoes, shell and elements for restoring the same to normal position.

7. In a friction shock absorbing mechanism, the combination with front and rear followers; of a plurality of longitudinally disposed friction plates interposed between said followers, said plates being alternated and divided into separated groups; means enclosing said groups of plates for resisting lateral outward movement thereof, said means having an abutment thereon; lateral pressure-creating means at each end of the mechanism, each lateral pressure-creating means including friction wedge shoes; a friction element interposed between each group of plates and the corresponding shoes, each of said elements having abutment means thereon; and tandem arranged yielding resistance means interposed between said lateral pressure means, and coacting with both of said abutment means.

8. In a friction shock absorbing mechanism, the combination with front and rear main followers; of a floating friction shell interposed between said followers, said shell having a central partition wall; a pair of longitudinally disposed, laterally displaceable friction elements at opposite sides of the longitudinal axis of the mechanism, each of said elements having abutment means thereon; wedge pressure-transmitting means at opposite ends of said mechanism and coacting with said friction elements; tandem-arranged springs between said elements co-operating with the wedge pressure-transmitting means, said springs having their inner ends engaging said partition wall and abutments; and a group of intercalated relatively movable friction plates interposed between each friction element and the corresponding side of the shell, said plates adapted to be engaged by said followers and moved relatively to each other upon approach of said followers.

9. In a friction shock absorbing mechanism, the combination with follower acting means; of a group of intercalated, relatively movable friction elements coacting with said follower means; means for restoring said elements to normal position, said means including a wear plate interposed between said follower acting means and the adjacent ends of the friction elements and co-operating with said ends, said plates being anchored to said elements; a lateral pressure resisting member disposed on one side of said elements; lateral pressure creating means on the outer side of said group of elements; means for limiting the relative lateral movement of said lateral pressure creating means and lateral pressure resisting member; and a spring resistance co-acting with said means for restoring said elements and said pressure creating means.

In witness that I claim the foregoing I have hereunto subscribed my name this 9th day of May, 1924.

STACY B. HASELTINE.